Feb. 8, 1955  L. DES VOIGNES  2,701,419
UNDERGROUND TANK PROBE
Filed June 7, 1954
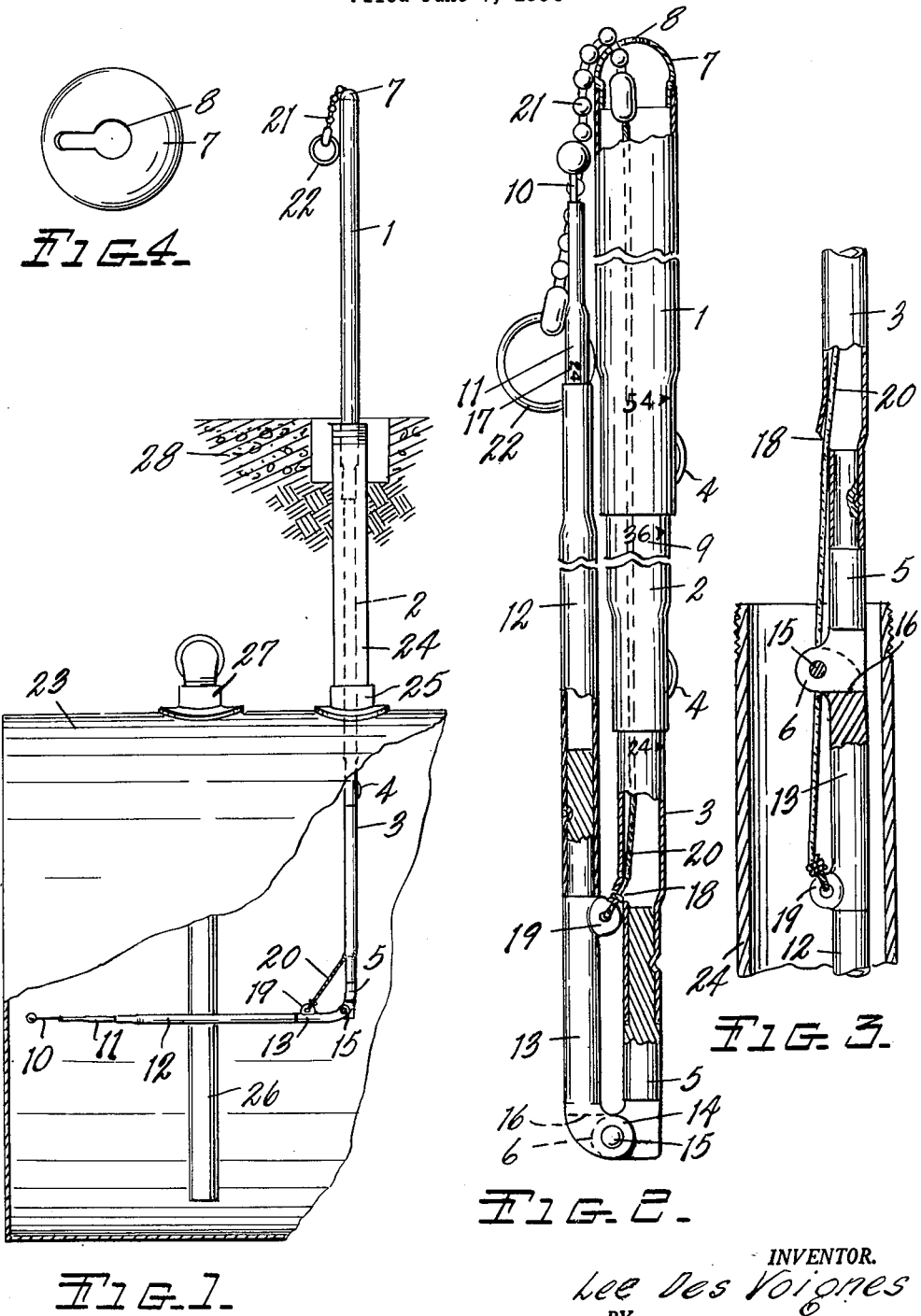
INVENTOR.
Lee Des Voignes
BY
Otto A. Earl
Attorney

United States Patent Office 2,701,419
Patented Feb. 8, 1955

2,701,419

UNDERGROUND TANK PROBE

Lee Des Voignes, Galesburg, Mich.

Application June 7, 1954, Serial No. 434,744

4 Claims. (Cl. 33—174)

This invention relates to improvements in probe for underground enclosures.

The principal objects of this invention are:

First, to provide a tool or instrument that may be inserted into small openings in underground enclosures and extended to locate the walls of the underground enclosure and fixtures thereon.

Second, to provide a tool of collapsible and telescopically extensible character capable of determining the distance between the walls of a buried enclosure and a small entry port through which the instrument is inserted into the enclosure.

Third, to provide a probe that is light and collapsible to small size for convenience in carrying and extensible to function in tanks and enclosures of different sizes.

Other objects and advantages of the invention will be apparent from a consideration of the following description and claims. The drawings illustrate a highly practical form of the probe.

Fig. 1 is a side elevational view of the probe operatively associated with a buried tank, portions of the tank being broken away in cross section.

Fig. 2 is a side elevational view of the probe in collapsed and folded position, portions of the probe being broken away in longitudinal cross section.

Fig. 3 is a fragmentary longitudinal cross sectional view through the probe and entrance conduit to a tank with the probe adjusted for entry into the tank.

Fig. 4 is a plan view of the top end of the probe.

Underground enclosures such as gasoline storage tanks are often installed and buried without record being kept of the size and location of the tank. When it is necessary to repair portions of the tank or connections thereto and when the position of the tank is unknown, it is often necessary to excavate large quantities of earth and further break out considerable areas of concrete over the tank to locate and have access to the part to be repaired. The present invention provides a tool or instrument by means of which the position of an underground tank and the location of the connection thereto may be predetermined without uncovering the entire area of the tank. It is thus possible to expose a preselected small portion of the tank for repairs with a minimum of excavating.

The probe comprises a handle or rod portion having an upper section 1, an intermediate section 2, and a lower section 3 of collapsible telescopic construction. Coacting detents 4 formed in the walls of the rod sections releasibly and yieldably lock the sections in extended position. The lower section 3 has a solid tip 5 mounted thereon and the end of the tip is formed with a laterally projecting pivot ear 6. The top section 1 of the rod is provided with a domed cap 7 having a key hole slot 8 formed in the top thereof. Desirably the rod sections 1, 2 and 3 are provided with length indicia 9 oriented with respect to the top of the pivot ear 6 when the rod sections are extended.

Attached to the lower end of the rod portion is a swingable arm portion having an outer section 10, intermediate section 11 and the inner section 12 telescopically arranged with respect to each other. The inner end of the inner section 12 has a solid tip portion 13 mounted therein and the inner end of the tip portion is slotted or bifurcated as at 14 to embrace the pivot ear 6 on the rod portion. A pivot pin 15 connects the rod and arm portions and the base 16 of the bifurcated portion of the tip on the arm portion is arranged to abut against the bottom of the end portion 5 as a stop, as illustrated in Fig. 3, to selectively position the arm portion of the probe in straight extended position relative to the rod portion.

Desirably the arm portion carries length indicia as at 17 oriented with respect to the pivot 15 when the arm portion is extended. The side of the lower section 3 of the rod defines a downwardly facing opening 18 and the outer end of the tip section 13 of the arm is provided with an ear or eye element 19. A tension strand 20 of fabric or metal cord is tied to the eye 19 and passed through the opening 18 and upwardly through the hollow rod portion of the probe. A ball link chain 21 is connected to the upper end of the tension strand and passes upwardly through the key hole slot 8 so selected links of the chain can be engaged in the key hole slot. A ring 22 on the end of the chain prevents the chain and tension strand from falling completely into the hollow rod portion.

The tool or probe is used, as illustrated in views 1 and 3. To insert the probe into a tank 23 the arm and rod portions are extended and the chain 21 and tension strand 20 are lowered into the rod portion to permit the arm portion to extend downwardly as a straight continuation of the rod portion. The probe can then be inserted through the filler tube 24 and the filler coupling 25 of the tank until the ear 6 passes into the tank proper. While new tanks are of standard size and diameter and it is unnecessary to measure their diameter, the upper surface of the ear 6 may be used as a locating stop against the inside of the upper wall of the tank and the depth of the top of the tank below the ground determined by reading the indicia 9. The arm portion of the probe can then be tilted laterally by pulling up on the ring 22 and tension strand 20 after which the end portion 5 of the rod may be lowered to the bottom of the tank and indicia 9 again noted to determine the depth of the tank.

After the depth of the tank is determined the rod portion is rotated with the arm portion extending laterally within the tank. The arm portion may be extended by a trial and error method until the outer end of the arm portion contacts the exposed walls of the tank. The key hole slot 8 in the top of the rod portion may be used as an indication of the direction at which the arm portion is projecting from the rod portion and the position of the tank as to length and width with respect to the filler pipe 24 can be determined.

Often fittings on the tank such as the suction tube 26 and the coupling 27 are positioned relatively close to the filler pipe 24 and by progressively extending the arm portion of the probe and rotating the probe within the tank, it is possible to quite closely locate the position of the coupling 27 and dig directly to the coupling through a small opening in the ground surface of concrete 28 which may lie over the tank.

It is thus unnecessary to excavate the entire top of the tank for repairs to a particular point along the side and a considerable savings in excavating costs can be obtained by utilizing the probe.

Having thus described the invention, what is claimed as new and is desired to be secured by Letters Patent is:

1. An underground tank probe comprising, a sectional telescopic hollow rod having holes formed in the top and near the bottom of the sides thereof, and end piece fitted in the bottom of said rod and having a laterally projecting pivot ear on its lower end, an upwardly facing stop on top of said ear, length indicia on said rod oriented with respect to said stop, a telescopically extensible arm having length indicia and pivotally connected to said pivot ear and swingable from side by side to extended perpendicular relation with respect to said rod, coacting stop portions on said rod and arm limiting swinging motion of the arm to one side of the rod, an eye on said arm spaced from said pivot, and an adjusting strand connected to said eye and extending through said rod and the openings therein to beyond the top of said rod, said strand including a lower cable portion and an upper chain portion lockingly engageable with the top of said rod, and a ring on the top of said chain.

2. An underground tank probe comprising, a sectional telescopic hollow rod having holes formed in the top and near the bottom of the side thereof, an end piece fitted in the bottom of said rod and having a laterally projecting pivot ear on its lower end, a telescopically extensible arm pivotally connected to said pivot ear and swingable from side by side to extended perpendicular relation with respect to said rod, coacting stop portions on said rod and arm limiting swinging motion of the arm to one side of the rod, an eye on said arm spaced from said pivot, and an adjusting strand connected to said eye and extending through said rod and the openings therein to beyond the top of said rod, said strand including a lower cable portion and an upper chain portion lockingly engageable with the top of said rod, and a ring on the top of said chain.

3. An underground tank probe comprising, a hollow rod having holes formed in the top and near the bottom of the side thereof, an end piece fitted to the bottom of said rod and having a laterally projecting pivot ear on its lower end, an upwardly facing stop on the bottom of said rod, length indicia on said rod oriented with respect to said stop, a telescopically extensible arm having length indicia and pivotally connected to said pivot ear and swingable from side by side to extended prependicular relation with respect to said rod, coacting stop portions on said rod and arm limiting swinging motion of the arm to one side of the rod, an eye on said arm spaced from said pivot, and an adjusting strand connected to said eye and extending through said rod and the openings therein to beyond the top of said rod, said strand including a lower cable portion and an upper chain portion lockingly engageable with the top of said rod.

4. An underground tank probe comprising, a hollow rod having holes formed in the top and near the bottom of the side thereof, an end piece fitted to the bottom of said rod and having a pivot ear on its lower end, an upwardly facing stop on the bottom of said rod, length indicia on said rod oriented with respect to said stop, an arm pivotally connected to said pivot ear and swingable from side by side to extended perpendicular relation with respect to said rod, coacting stop portions on said rod and arm limiting swinging motion of the arm to one side of the rod, an eye on said arm spaced from said pivot, and an adjusting strand connected to said eye and extending through said rod and the openings therein to beyond the top of said rod, said strand including a lower cable portion and an upper chain portion lockingly engageable with the top of said rod.

References Cited in the file of this patent

UNITED STATES PATENTS

| Number | Name | Date |
|---|---|---|
| 667,516 | Gibboney | Feb. 5, 1901 |
| 745,357 | Lanham | Dec. 1, 1903 |
| 1,112,699 | Houston | Oct. 6, 1914 |
| 1,457,964 | Doty | June 5, 1923 |